US010750719B2

(12) United States Patent
Crews

(10) Patent No.: US 10,750,719 B2
(45) Date of Patent: *Aug. 25, 2020

(54) ADJUSTABLE, MOUNTABLE FEED BUCKET

(71) Applicant: Lock-N-Load Feed Systems, LLC, Barboursville, WV (US)

(72) Inventor: William Gregory Crews, Barboursville, WV (US)

( * ) Notice: Subject to any disclaimer, the term of this patent is extended or adjusted under 35 U.S.C. 154(b) by 327 days.

This patent is subject to a terminal disclaimer.

(21) Appl. No.: 15/936,550

(22) Filed: Mar. 27, 2018

(65) Prior Publication Data

US 2018/0213746 A1 Aug. 2, 2018

Related U.S. Application Data

(63) Continuation-in-part of application No. 15/287,417, filed on Oct. 6, 2016, now Pat. No. 10,117,415.

(60) Provisional application No. 62/376,061, filed on Aug. 17, 2016.

(51) Int. Cl.
*A01K 5/01* (2006.01)
*A01K 1/10* (2006.01)

(52) U.S. Cl.
CPC ............ *A01K 5/0107* (2013.01); *A01K 1/105* (2013.01); *A01K 5/01* (2013.01)

(58) Field of Classification Search
CPC .................................. A01K 5/01; A01K 5/0107
USPC ................... 119/51.01, 58, 61.1, 61.5, 61.57
See application file for complete search history.

(56) References Cited

U.S. PATENT DOCUMENTS

| 2,309,830 | A | 2/1943 | Dearle |
| 4,798,170 | A | 1/1989 | DePiazzy |
| 4,821,678 | A | 4/1989 | Atchley |
| 5,467,733 | A | 11/1995 | Messina |
| 5,669,329 | A | 9/1997 | Krause |
| 6,189,489 | B1 | 2/2001 | Pearce |
| 6,427,958 | B1 | 8/2002 | Looney |
| 6,526,911 | B2 * | 3/2003 | Louden ................ A01K 1/0356 119/51.01 |
| 6,604,488 | B2 * | 8/2003 | Heinzeroth ............ A01K 5/025 119/61.57 |

(Continued)

FOREIGN PATENT DOCUMENTS

| CN | 2073749083 U | 8/2014 |
| EP | 1488693 A1 | 12/2004 |

(Continued)

OTHER PUBLICATIONS

International Preliminary Report pertaining to International Application No. PCT/US2016/056021 dated Feb. 28, 2019.

(Continued)

*Primary Examiner* — David J Parsley
(74) *Attorney, Agent, or Firm* — Dinsmore & Shohl LLP; Monika L'Orsa Jaensson, Esq.

(57) ABSTRACT

A mountable feed bucket suitable for securing to a fence rail, having a receptacle and one or more brackets for securing the mountable feed bucket to the fence rail. The brackets include multiple bracket legs forming a vacuous area with the receptacle suitable for receiving a fence rail. Further, a removable secondary mount is provided to facilitate affixation to other structures, such as stall walls and doors, bars or girders of portable horse stalls, and like structures. Methods for mounting feed buckets are also provided.

20 Claims, 6 Drawing Sheets

(56) References Cited

U.S. PATENT DOCUMENTS

| | | |
|---|---|---|
| 7,513,219 B2 | 4/2009 | Louden |
| 7,789,041 B1 | 9/2010 | Taylor |
| 8,833,596 B2 | 9/2014 | Sanguinet et al. |
| 10,117,415 B2 * | 11/2018 | Crews .................. A01K 5/01 |
| 2005/0217593 A1 | 10/2005 | Rice |
| 2007/0045492 A1 | 3/2007 | Moran |
| 2012/0187270 A1 | 7/2012 | Haarlander et al. |
| 2015/0076175 A1 | 3/2015 | Smith |
| 2018/0049404 A1 | 2/2018 | Crews |

FOREIGN PATENT DOCUMENTS

| | | |
|---|---|---|
| KR | 200448348 Y1 | 3/2010 |
| KR | 101630603 B1 | 6/2016 |

OTHER PUBLICATIONS

Office Action pertaining to U.S. Appl. No. 15/287,417 dated Jul. 11, 2018.

International Search Report and Written Opinion pertaining to PCT/US2016/056021 dated May 11, 2017.

Search Report pertaining to International Application No. PCT/US2018/033588 dated Dec. 13, 2018.

* cited by examiner

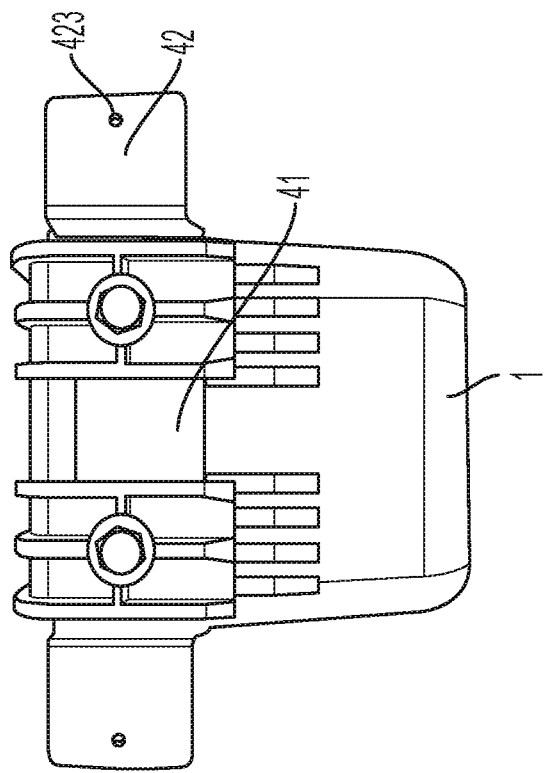
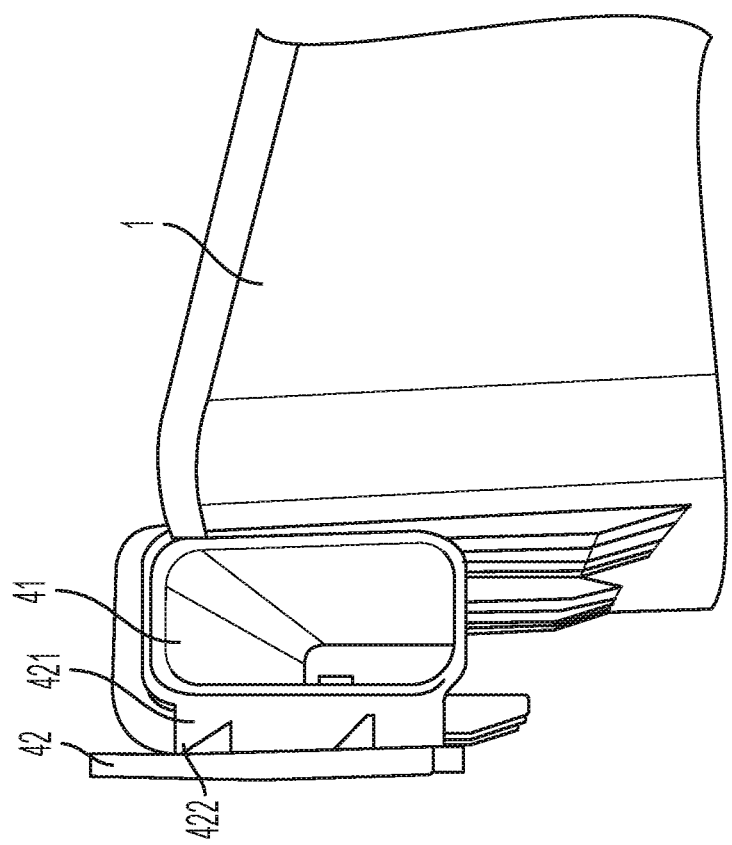

ADJUSTABLE, MOUNTABLE FEED BUCKET

BACKGROUND OF THE TECHNOLOGY

The disclosed technology regards an adjustable, mountable feed bucket suitable for securing to a fence rail and other structures, and a method of securing a feed bucket to a fence rail and other structures.

Presently feed buckets may be mounted to fence rails to provide a comfortable way to feed horses. However, frequently the feed buckets are weakly secured to the fence rail, and the horse is able to knock it off of the rail and on to the ground, thereby requiring that an individual retrieve the feed bucket from within the fenced area, which can be dangerous. Alternatively, feed buckets may be permanently secured to the fence rail; however, cleaning the buckets is difficult when so secured, and eventually they fail, leaving exposed screws as a hazard to both humans and animals. Therefore, there is a need to develop a mountable feed bucket that may be easily positioned and removed from a fence rail, but is secured so that a horse cannot remove the same from its position on the rail.

The disclosed technology provides a mountable feed bucket that may be easily positioned and removed from the fence rail by a person, but is secured so that the horse cannot remove the same from its position on the rail. Further, the disclosed technology provides a method for mounting a feed bucket on a fence rail in a manner that allows it to be easily positioned and removed from the fence rail, but secures the feed bucket so that a horse cannot remove the same from its position on the rail. The disclosed technology further provides for an adaptable, mountable feed bucket that may be mounted to a fence rail or to other structures, such as stall walls and doors, bars or girders of portable horse stalls, and like structures.

GENERAL DESCRIPTION OF THE DISCLOSED TECHNOLOGY

The disclosed technology regards a mountable feed bucket suitable for securing to a fence rail or other structure. The mountable feed bucket includes a receptacle, one or more brackets affixed to the receptacle to form a vacuous area to receive a fence rail, and one or more affixation means to secure the feed bucket to the rail. The mountable feed bucket may comprise a removable secondary mount having a body sized and configured to be received and secured within a vacuous area formed by the brackets, the secondary mount comprising a pair of feet secured at each end of the body, each foot comprising an aperture for receiving a fastener such as a cable tie, or other affixation means such as screws, to facilitate affixation of the secondary mount to the structure.

The receptacle is defined by a top rim, a base, and front, back, and a pair of side walls, with a trough formed on the front wall of the receptacle.

One or more brackets are affixed to the receptacle, each bracket having at least two legs, the first leg extending orthogonally from the back receptacle wall, and the second leg extending perpendicular to the first bracket leg, at a first end of the first bracket leg, thereby forming a vacuous area between the back receptacle wall and the second bracket leg. This vacuous area is suitable for receiving a fence rail or the removable secondary mount. The bracket may further include a third leg extending perpendicular to the first bracket leg, at a second end of the first bracket leg opposing the first bracket end. When present, the third bracket leg is at least partially affixed to the back receptacle wall. Any or all of the bracket legs may have ribs with (or without) reinforcing structure between at least a portion of the ribs, and the ribs may be grouped in sets (with or without reinforcing structure between the rib sets).

One or more affixation means are provided, each including a pin (with or without a handle, such as a cross handle) for securing the mountable feed bucket to a fence rail or the removable secondary mount. The second bracket leg includes one or more apertures sized and configured to receive the pin of the affixation means; the apertures may be threaded to receive a threaded post of the pin. The pin of the affixation means is designed and configured to extend through and beyond the aperture a distance to securely abut against an outer face of the fence rail when the mountable feed bucket is positioned on the fence rail, or to be received within a corresponding aperture of the removable secondary mount. In some embodiments the affixation means may be a lever system, such as a push-pull toggle clamp having a lever handle rotatably affixed to a pin.

The removable secondary mount comprises a tubular or solid body sized and shaped to fit within at least an upper portion of the vacuous area between the receptacle wall and the second bracket leg of the mountable feed bucket, so that the top of said body abuts the underside of the first orthogonal leg of the bracket, and the side walls of the body abut the interior walls of the second leg of the bracket and the back wall of the receptacle or the third leg of the bracket, if present. By this configuration, the secondary mount may sit snuggly within at least the upper portion of the vacuous area formed by the bracket legs, but is easily removable therefrom. Feet extend from each end of the tubular or solid body, extending from and beyond a side wall thereof so that when the tubular structure is received within the vacuous area of the receptacle, the feet are positioned at or beyond the exterior side of the second legs of the bracket member; by this configuration the bracket member does not interfere with the mounting of the feet against a structure. Each foot comprises an aperture designed and configured to receive affixation means such as, for example, a screw, nail, or cable tie. The body of the removable secondary mount may have apertures corresponding with the apertures of the second bracket leg to receive affixation means and secure the removable secondary mount within the vacuous area formed by the bracket legs.

The disclosed technology further regards a method of mounting a feed bucket on a fence rail. The method includes the steps of providing a mountable feed bucket including a receptacle defined by a top rim, a base, and front, back, and a pair of side walls, and further having a trough formed on the front side of the receptacle. The feed bucket useful in this method further includes one or more brackets affixed to the receptacle, each bracket having at least two legs, the first leg extending orthogonally from the back side of the receptacle, and the second leg extending perpendicular to the first bracket leg, forming a vacuous area between the back receptacle wall and the second bracket leg, the vacuous area being suitable for receiving a fence rail. A third bracket leg may be positioned along the back receptacle wall to strengthen the mountable feed bucket. In this method the feed bucket is further provided with affixation means, such as a threaded post with a cross handle at one end, or a push-pull toggle clamp comprising a pin and a lever for securing the mountable feed bucket to the fence rail. The second bracket leg comprises an aperture sized and configured to receive the pin of the affixation means, wherein the post/pin extends through the aperture a distance to securely abut against the outer face of the fence rail.

The method further includes the step of securing the mountable feed bucket to the fence by positioning the bracket about a fence rail so that the rail is at least partially within the vacuous area between the back receptacle wall and the second bracket leg. Thereafter, the method is practiced by inserting the pin of an affixation means through the aperture of the second bracket a distance so that the pin rests securely upon the fence rail; when a lever affixation means is provided, the lever may be rotated to cause the pin to be secured against the fence rail, and the feed bucket to be secured to the fence rail.

The disclosed technology further regards a method of removably mounting a feed bucket on a structure, such as for example stall walls and doors, bars or girders of portable horse stalls, and like structures. This method includes the steps of providing a mountable feed bucket as hereinabove described for mounting on a fence rail, wherein the feed bucket further comprises a removable secondary mount having a body sized and configured to be received within the vacuous area between the back receptacle wall and the second bracket leg. The body of the removable secondary mount is removably secured to the mountable feed bucket by affixation means such as those herein described, wherein the body comprises one or more apertures aligned with the apertures of the second bracket leg to receive the affixation means. In this method, the removable secondary mount further includes a pair of feet, each foot extending from one end of the body, and comprising an aperture to receive further affixation means, such as a cable tie. The feet are positioned relative to the body so that when the removable secondary mount is positioned within the vacuous area formed by the brackets, the feet extend to or beyond the exterior surface of the second bracket leg (and any protruding affixation means securing the removable secondary mount to the second bracket); in this configuration, the second bracket leg does not interfere with mounting the feet directly on a surface.

This method further includes the step of securing the mountable feed bucket to the structure by inserting the affixation means, such as a screw, bolt or cable tie, through the apertures of the feet of the removable secondary mount, and into or about the structure.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE DRAWINGS

FIG. 9 is a back view of an embodiment of the removable secondary mount secured to an embodiment of the mountable feed bucket of the disclosed technology.

FIG. 10 is a side view of the embodiments of the disclosed technology shown in FIG. 9.

Figure 1:
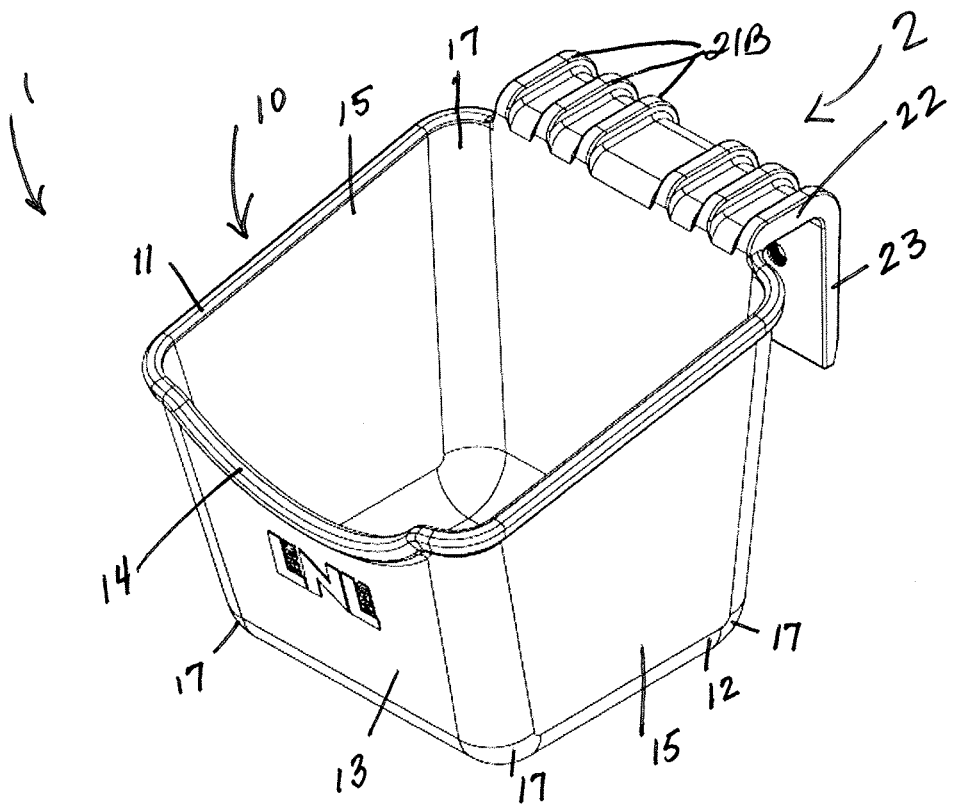
FIG. 1 is a peripheral view of an embodiment of the disclosed technology.
Figure 2:
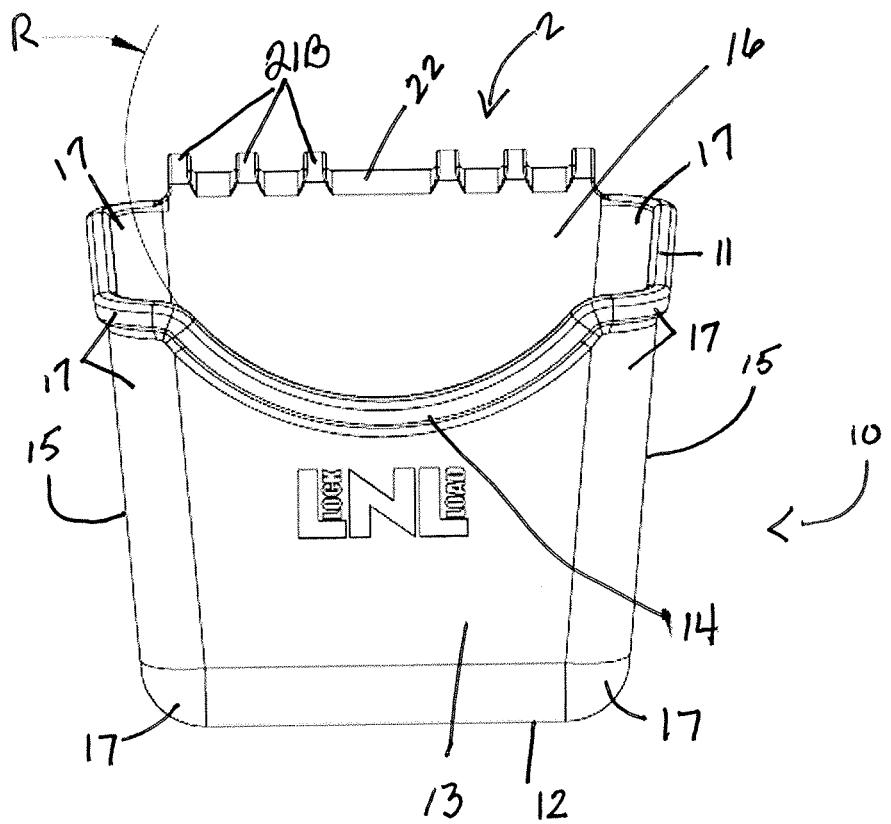
FIG. 2 is a front view of the embodiment of the disclosed technology shown in FIG. 1.
Figure 3:
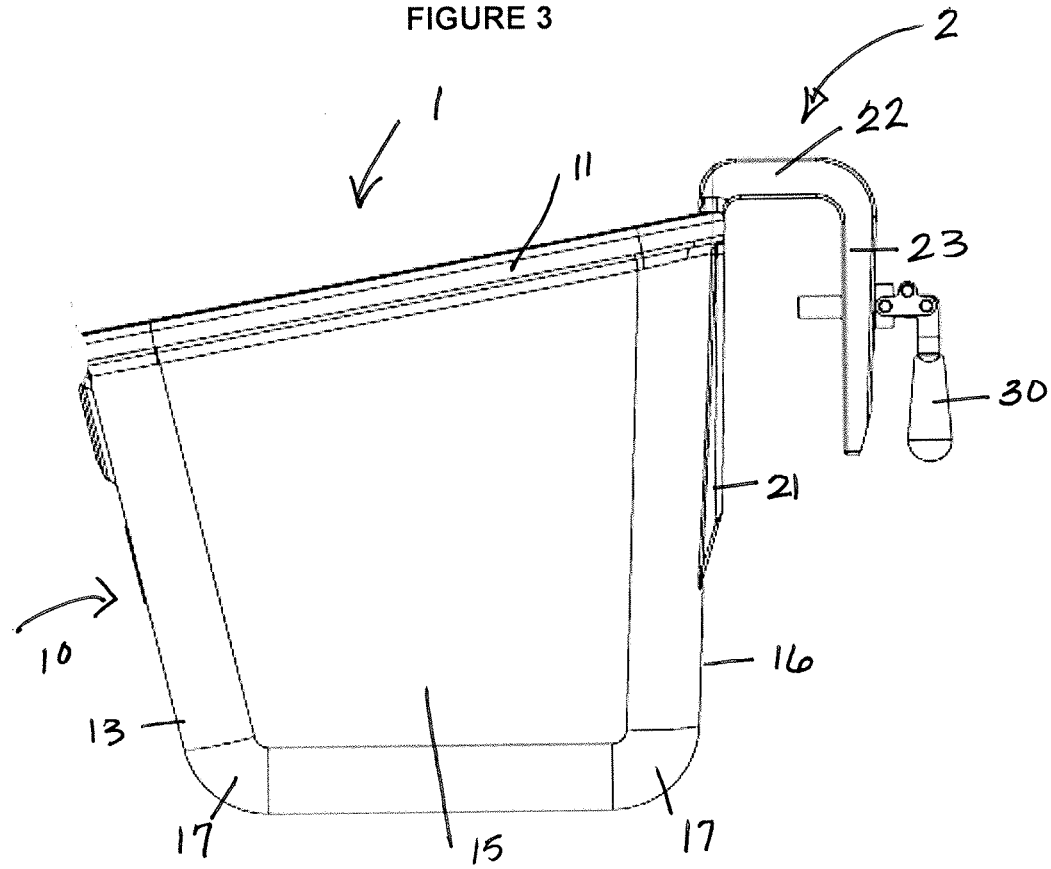
FIG. 3 is a side view of the embodiment of the disclosed technology shown in FIG. 1.

DETAILED DESCRIPTION OF THE DISCLOSED TECHNOLOGY:

As shown in FIGS. 1-4, an embodiment of the mountable feed bucket 1 of the disclosed technology is formed from a high density polyethylene or polypropylene, comprising a receptacle 10 defined in some embodiments by a declining internal area from its top rim 11 to its base 12, and from its back wall 16 to its front wall 13, with a trough 14 formed on the front wall of the receptacle. The receptacle 10 at its top rim 11 may have (a) a width of between about 10-12" (25.4-30.5 cm), or in some embodiments 10.5" (26.7 cm), which width may vary from the back wall to the front wall; and (b) a length from its back wall to its front wall of between about 10-12" (25.4-30.5 cm), or in some embodiments 10.4" (26.4 cm). In this embodiment the receptacle 10 is further defined by a declining height from its back wall (between about 11-13" (27.9-33.0 cm), or in some embodiments 10.261" (26.1 cm)) to its front wall (between about 7"-9" (17.8-22.9 cm), or in some embodiments 8.322" (21.1 cm)); wherein the front wall extends outward from the base 12 by an angle of 10-20 degrees from perpendicular, or in some embodiments about 15.83 degrees from perpendicular.

This embodiment of the receptacle 10 further comprises side walls 15 which may be slightly angled outward from the base wall 12 to the top rim 11 at an angle of 1-10 degrees from perpendicular, or in some embodiments about 5 degrees from perpendicular, and may be angled inward from the back wall 16, by 0.005 to 3 degrees from perpendicular, or 0.025 degrees from perpendicular. The trough 14 may extend with a radius of curvature R from the rim at the front side of the bucket, wherein the radius of curvature R may be about 4"-6" (10.2-15.2 cm), or in some embodiments about 5" (12.7 cm).

The receptacle 10 may have a reinforced top rim 11, extending about the top surface of the receptacle, and forming the top surface of the trough 14 on the front receptacle wall 13.

The walls of each of the front 13, back 16 and sides 15 of the receptacle may be about 0.2" to 0.75" (0.5-1.9 cm) thick; in some embodiments the wall thickness is about 0.445" (1.1 cm).

In some embodiments the edges 17 among the walls 13, 15 and 16 of the receptacle, and from its walls 13, 15 and 16 to its base 12, are curved, with a radius of curvature of 1" to 2" (2.5-5.1 cm), or in some embodiments 1.25" (3.2 cm).

Figure 6:
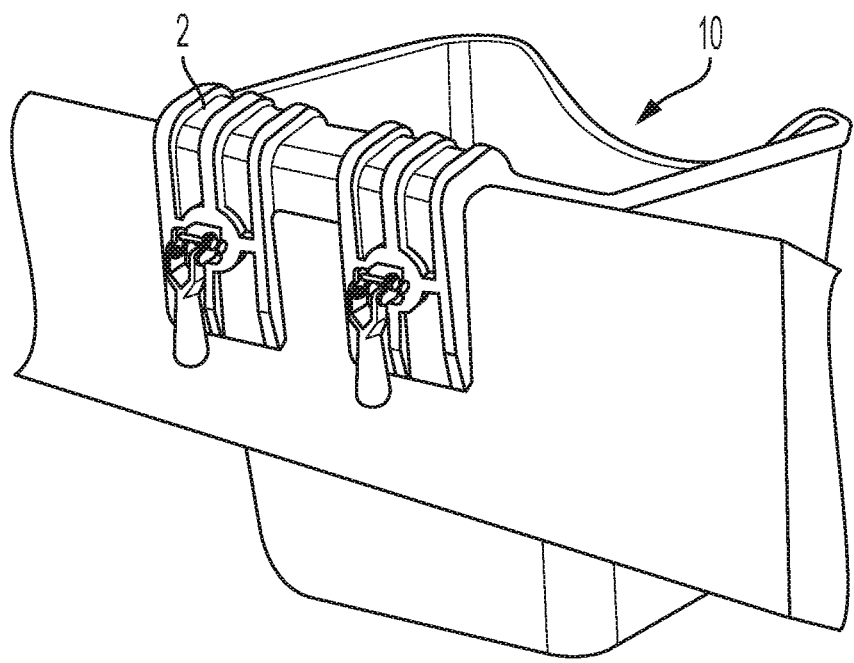
FIG. 6 is a perspective view of the embodiment of the disclosed technology shown in FIG. 1, installed on a fence rail in accordance with the method of the disclosed technology.

As shown in FIGS. 1-4, affixed to and extending along and from the back 16 of the receptacle 10 is a bracket 2, comprising two or three bracket legs. In some embodiments, the first bracket leg 22 extends orthogonally from the back receptacle wall 10. A second bracket leg 23 extends perpendicular to the first bracket leg 22, at a first end, forming a vacuous area between the back receptacle wall 16 and the second bracket leg 23, the vacuous area being suitable for receiving a fence rail as shown in FIG. 6, or a removable secondary mount, as shown in FIGS. 9 and 10.

In some embodiments the bracket includes a third bracket leg 21, extending perpendicular to the first bracket leg 22, at a second end of the first bracket leg opposing the first bracket leg end, wherein said third bracket leg is at least partially affixed to the back receptacle wall 16. The third bracket leg 21 may include a plurality of ribs 21A. The ribs 21A may number from 2 to 16, or more, and are affixed to or extending from the back wall 16 of the bucket, from the rim 11 to about or beyond half the depth of the back wall 16. The ribs 21A may be grouped together in two or more corresponding sets; these sets may be separated by a greater distance than the separation among the individual ribs 21A, by 1.5"-3" (3.8-7.6 cm), or about 2.150" (5.5 cm). The ribs may be between 0.25"-1" (0.6-2.5 cm) wide; in some embodiments the ribs are about 0.425" (1.1 cm) wide.

As shown in FIGS. 1-4, a second plurality of ribs 21B, numbering between 2 and 16, may extend in a u-shaped elbow to form the first bracket leg 22, beginning at or near the rim of the bucket to a distance above the plane of the rim of the bucket, extending orthogonally out from the back receptacle wall 16 to a first end, and perpendicularly traversing therefrom to a position relatively parallel to the back wall 16 of the receptacle to form the second bracket leg 23, concluding at a position parallel to about or beyond the midpoint of the height of the ribs 21A; in some embodiments this second leg is between 3-7" (7.6-17.8 cm), or about 4.750" (12.1 cm), from the top of the first bracket leg 22. In some embodiments the first bracket leg 22 formed by the ribs 21B and corresponding support structure preferably extends above the top rim 11 of the receptacle by 0.2" to 2" (0.5-5.1 cm), or in some embodiments 0.7" (1.8 cm), with a relatively rectangular interior shape, the first bracket leg having a length of about 1" to 3" (2.5-7.6 cm), or in some embodiments 1.2" (3.0 cm), so that the bracket is sized, configured and affixed to the receptacle 10 to allow the mountable feed bucket to be positioned on a standard square fence rail. In some embodiments the interior shape of the first bracket leg 22 (alone or in combination with the second bracket leg 23 and/or the third bracket leg 21) is differently sized and/or shaped to accommodate and correspond with differently shaped fence rails or other support structures.

In some embodiments the number of ribs 21A is equal to the number of ribs 21B; in the embodiment shown in FIGS. 1-4, the ribs 21A differ from the number of ribs 21B (in the embodiment shown there are eight ribs 21A, grouped in two groups of four, and six ribs 21B, grouped in two groups of three). Each rib has a width of between about 0.25"-1" (0.6-2.5 cm), or about 0.425" (1.1 cm), and a thickness of between 0.25"-0.5" (0.6-1.3 cm), or about 0.375" (1.0 cm).

Figure 4:
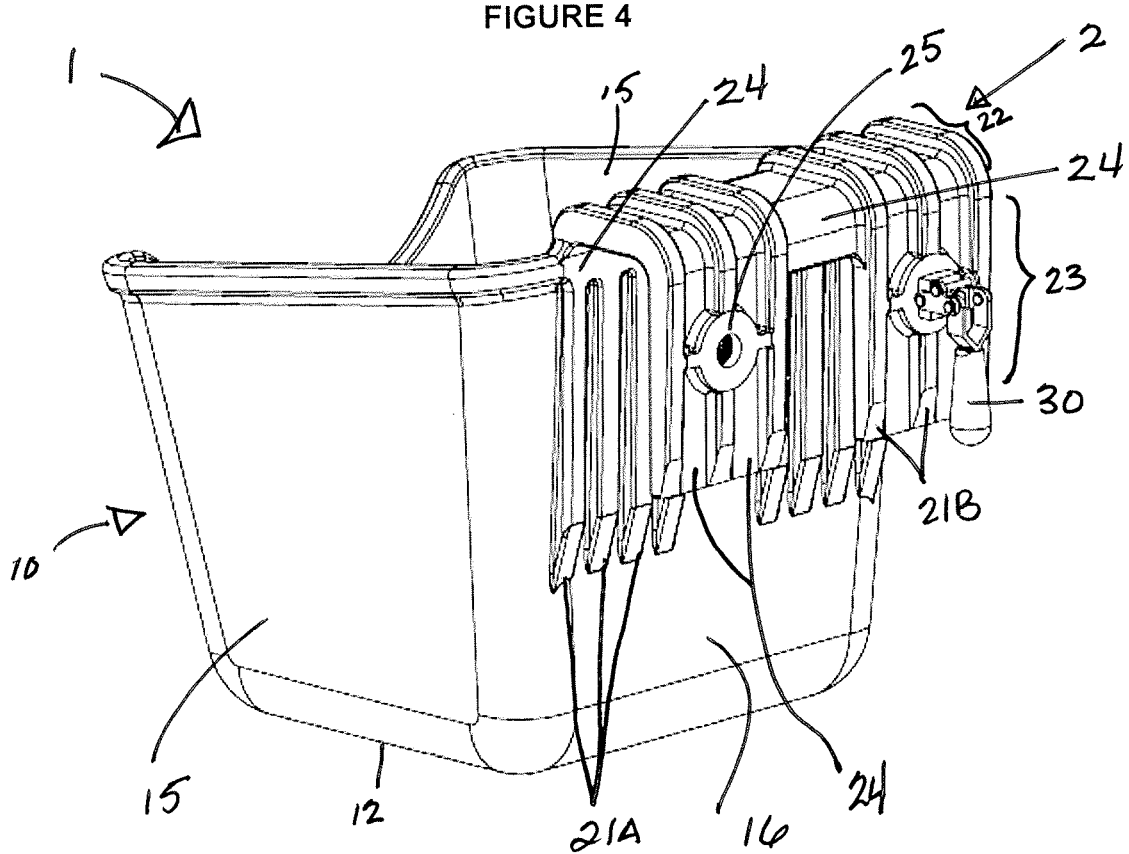
FIG. 4 is a peripheral view from the back of the embodiment of the disclosed technology shown in FIG. 1.

As shown in FIG. 4, a reinforcing structure 24 may connect the tops of the ribs 21A at the back receptacle wall 16, below the rim 11, wherein the reinforcing structure may have a depth equal to the depth of the ribs 21A to form a solid surface collar at this portion of the first bracket leg 21. The reinforcing structure 24 may further extend down a portion or along the entire length of the third bracket leg 21, between ribs within a group of ribs, and/or between groups of ribs. Likewise or alternatively, the reinforcing structure 24 may extend between the ribs 21B, about the first bracket leg 22, and to a portion of or all of the length of the second bracket leg 23. The reinforcing structure 24 of the first and second bracket legs may have a thickness less than the ribs 21B, so that the ribs protrude from the surface of the reinforcing structure 22. In some embodiments as shown in FIGS. 1-4, the reinforcing structure may exist between two or more groupings of ribs 21B through their length of the first bracket leg 22, and in some embodiments extend into a portion or all of the length of the rib groupings of the second bracket leg 23.

Figure 5:
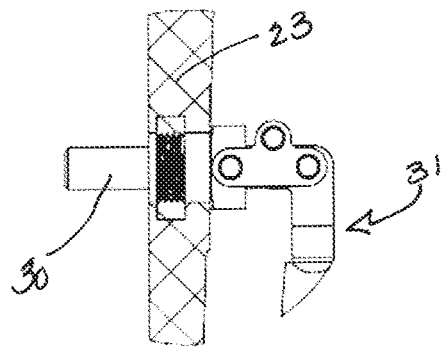
FIG. 5 is a side view of a portion of the second bracket leg and affixation means of the embodiment of the disclosed technology shown in FIG. 1.
Figure 7A:
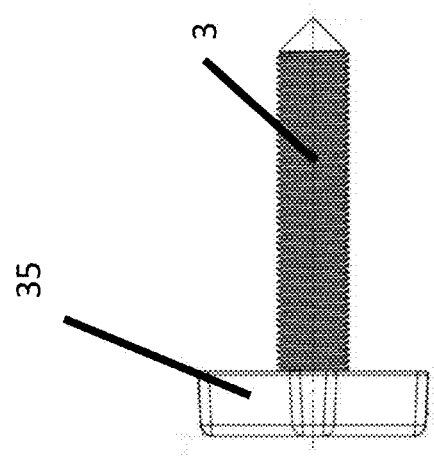
FIG. 7A is a top view.
Figure 7B:
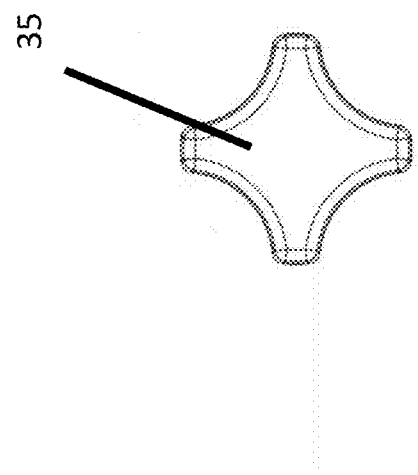
FIG. 7B is a side view, of another embodiment of the affixation means of the disclosed technology.

Each of the groupings of ribs 21B may comprise an aperture 25 for receiving a securing mechanism 30, such as a screw, a threaded post 3 having a blunted, cone shaped tip, with a cross-bar handle 35 secured to an end thereof (as shown in FIGS. 7A and 7B), or a lever system or a push-pull toggle clamp comprising a lever handle 31 rotatably affixed to a pin 32 (as shown in FIG. 5). As shown in FIG. 4, the aperture 25 may have a thickness equal to the thickness of the ribs 21B, so as to form a flat surface to support the securing mechanism 30. The pin 32 extends through and beyond the aperture 25 a distance to securely abut against the outer face of the fence or other support structure. The center of the apertures may be positioned about 2"-3" (5.1-7.6 cm), or 2.5" (6.4 cm), from the bottom of the ribs 21C.

Figure 8:
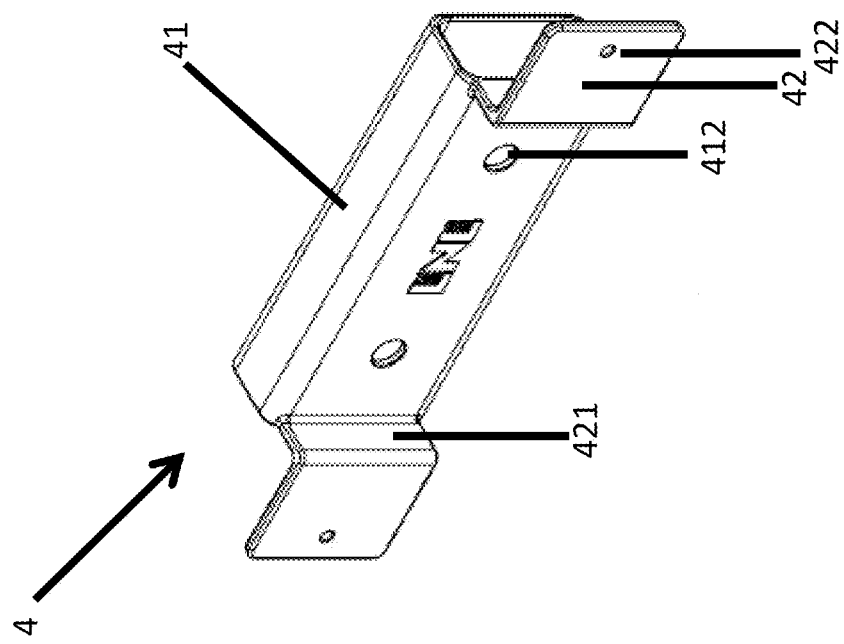
FIG. 8 is a side view of an embodiment of the removable secondary mount of the disclosed technology.

As shown in FIGS. 8-10, a removable secondary mount 4 of the disclosed technology comprises a tubular or solid body 41 sized and shaped to fit within at least an upper portion of the vacuous area between the receptacle wall (or third bracket leg) and the second bracket leg of the mountable feed bucket described in earlier embodiments, so that when positioned within the vacuous area of the mountable feed bucket, the top of said body abuts the underside of the first orthogonal leg of the bracket, and the side walls of the body respectively abut the interior wall of the second leg of the bracket and the back wall of the receptacle or the third leg of the bracket, if present. Thereby, the secondary mount 4 may sit snuggly within at least an upper portion of the vacuous area formed by the first and second bracket legs and the receptacle wall or third bracket leg, if present, but is easily removable therefrom.

The body 41 may be removably affixed to the mountable feed bucket, at the vacuous area, by affixation means and one or more apertures 412 along a first side wall of the body 41, the apertures 412 being aligned with the apertures 25 of the second bracket leg 23 so that affixation means, such as bolts or screws, may be threaded or otherwise secured through the aligned apertures 412 and 25.

As shown in FIGS. 8-10, a pair of feet 42 coupled with a linking support 421 extend from corresponding ends of the tubular or solid body 41. The linking support 421, being affixed perpendicularly to the length of the body, allows the feet to assume a separate plane parallel with a side wall of the body so that when the body of the removable secondary mount is received within the vacuous area of the mountable feed bucket, the feet are positioned in a plane coexistent with or beyond the plane of the second bracket legs 23 (see, e.g., FIG. 10). In this configuration, the second bracket legs do not interfere with the feet being in full contact with a surface, such as stall walls and doors, or bars and girders of portable horse stalls, or other similar structures. If used, securing mechanism 30 may have a depth beyond the exterior surface of the second bracket when used to secure the removable secondary mount within the vacuous area formed by the brackets of the mountable feed bucket, and should be considered when designing the length of the linking support (and the positioning of the feet) so that the securing mechanisms do not protrude past the plane of the feet when the unit is assembled, as herein described. As shown in FIG. 10, one or more wedge or similar supports 422 may be secured to the feet 42 and the linking support 421, to provide added support to the structure.

An aperture 423 is positioned on each foot 42, capable of receiving cable ties, screws, bolts or similar affixation means, facilitating the mounting of the feed bucket of the disclosed technology on other surfaces.

The receptacle walls and base, and in some embodiments the bracket, may be formed together in a single mold, or in any number of separate molds with one or more of the components adjoined together by plastic welding, tape, or glue. Likewise, the removable secondary mount may be formed in a single mold, or in separate molds, with components adjoined.

The disclosed technology further regards a method of mounting a feed bucket on a fence rail. The method includes the steps of providing a mountable feed bucket including a receptacle defined by a top rim, a base, and front, back, and a pair of side walls, and further having a trough formed on the front side of the receptacle. The feed bucket useful in this method further includes one or more brackets affixed to the receptacle, each bracket having at least two legs, the first leg extending orthogonally from the back side of the receptacle, and the second leg extending perpendicular to the first bracket leg, forming a vacuous area between the back receptacle wall and the second bracket leg, the vacuous area being suitable for receiving a fence rail. A third bracket leg may be affixed to the opposing end of the first bracket leg and to the back wall of the receptacle. In this method the feed bucket is further provided with securing mechanisms, such as a screw or bolt, a threaded post having a blunted, cone shaped tip, with a cross-bar handle secured to an end thereof, or a push-pull toggle clamp having a pin and a lever for securing the mountable feed bucket to the fence rail. The second bracket leg comprises an aperture sized and configured to receive the pin of the affixation means, allowing the pin to extend through the aperture a distance to securely abut against the outer face of the fence rail when the fence rail is received within the vacuous area of the brackets. Suitable mountable feed buckets for this method include the feed buckets described above in this disclosure.

The method further includes the step of securing the mountable feed bucket to the fence by positioning the bracket about a fence rail so that the rail is within the vacuous area between the back receptacle wall and the second bracket leg. Thereafter, the method is practiced by inserting a pin of the affixation means through the aperture of the second bracket a distance so that the pin rests securely upon the fence rail; the push-pull toggle clamp, if any, may be rotated to a locked position (as shown in FIG. 5) causing the pin to removably secure the feed bucket to the fence rail.

The disclosed technology further regards a method of removably mounting a feed bucket on a structure, such as for example stall walls and doors, bars or girders of portable horse stalls, and like structures. This method includes the steps of providing a mountable feed bucket as hereinabove described for mounting on a fence rail, wherein the feed bucket further comprises a removable secondary mount having a body sized and configured to be received within the vacuous area between the back receptacle wall and the second bracket leg of the mountable feed bucket. The body of the removable secondary mount may be removably secured to the mountable feed bucket by affixation means such as those herein described, wherein the body comprises one or more apertures aligned with apertures of the second bracket leg to receive the affixation means. In this method, the removable secondary mount further includes a pair of feet, each foot extending from one end of the body, and comprising an aperture to receive further affixation means, such as a cable tie, screw or other affixation means. The feet are positioned relative to the body so that when the removable secondary mount is positioned within the vacuous area formed by the brackets, the feet extend to or beyond the exterior surface of the second bracket leg (and any portion of the securing means that may protrude from the exterior surface of the second bracket leg, when used to secure the secondary mount to the feed bucket); in this configuration, the second bracket leg and any securing means do not interfere with mounting the feet directly on a surface.

The method further includes the step of securing the mountable feed bucket to the structure by inserting affixation means, such as a screw, bolt or cable tie, through the apertures of the feet of the removable secondary mount, and into or about the structure.

The foregoing is considered as illustrative only of the principles of the invention; in particular, the dimensions aforedescribed are intended for illustration. Further, since numerous modifications and changes readily will occur to those skilled in the art, it is not desired to limit the invention to the exact construction and operation shown and described and, accordingly, all suitable modifications and equivalents may be resorted to, falling within the scope of the invention.

The invention claimed is:

1. An adaptable, mountable feed bucket suitable for securing to a fence rail, the mountable feed bucket comprising:
   a. a receptacle defined by a receptacle top rim, a receptacle base, and front, back, and a pair of side receptacle walls, and further having a receptacle trough formed on the front receptacle wall;
   b. one or more brackets affixed to the receptacle, each bracket having a first bracket leg extending orthogonally from the back receptacle wall, a second bracket leg extending perpendicular to the first bracket leg, at a first end of the first bracket leg, thereby forming a vacuous area between the back receptacle wall and the second bracket leg, the vacuous area being suitable for receiving a fence rail, and a third bracket leg extending perpendicular to the first bracket leg, at a second end of the first bracket leg opposing the first end of the first bracket leg,
      wherein each of the second and third bracket legs comprises two sets of two or more bracket leg ribs;
      wherein the bracket leg ribs of the third bracket leg are affixed to the back receptacle wall, and extend a length from the receptacle top rim to at least half the height of the back receptacle wall; and
      wherein the bracket leg ribs of the second bracket leg extend from the first end of the first bracket leg a length of at least one-half of the length of the bracket leg ribs of the third bracket leg; and
   c. a removable secondary mount comprising a body sized and shaped to fit within at least a portion of the vacuous area, and a pair of feet extending from opposing ends of a side wall of the body, each of the feet comprising an aperture sized and configured to receive a cable tie, screw or bolt for securing the mountable feed bucket to a structure.

2. The adaptable, mountable feed bucket of claim 1, further comprising a first securing means to secure the second bracket leg to a fence rail, and wherein the second bracket leg comprises an aperture sized and configured to receive a pin of the securing means, and wherein the pin is designed and configured to extend through and beyond the aperture a distance to securely abut against an outer face of the fence rail when the mountable feed bucket is positioned on the fence rail.

3. The adaptable, mountable feed bucket of claim 2, further comprising a second securing means having a post to secure the second bracket leg to the removable secondary mount, and wherein the pin is designed and configured to extend through and beyond the aperture of the second bracket leg a distance into a corresponding aperture positioned on the body of the removable secondary mount when the removable secondary mounted is positioned within the vacuous area.

4. The adaptable, mountable feed bucket of claim 1, wherein the body of the removable secondary mount is tubular.

5. The adaptable, mountable feed bucket of claim 1, wherein the feet of the removable secondary mount are coupled to the body by means of a linking support affixed perpendicularly to a length of the body, thereby positioning the feet to assume a plane parallel with a side wall of the body so that when the body is received within the vacuous area, the plane of the feet is coexistent with or beyond a plane of the second bracket legs.

6. The adaptable, mountable feed bucket of claim 5, further comprising one or more wedge supports secured to the feet and the linking support of the removable secondary mount.

7. The adaptable, mountable feed bucket of claim 1, wherein the receptacle and the removable secondary mount are formed from a high density polyethylene.

8. The adaptable, mountable feed bucket of claim 1,
a. wherein the back receptacle wall has a width of between about 10" and 12" (25.4 cm-30.5 cm), and a height of between about 10" and 12" (25.4 cm-30.5 cm);
b. wherein the front receptacle wall has a width less than the width of the back receptacle wall, and a height of between about 7" and 9" (17.8 cm-22.9 cm); and
c. wherein the receptacle trough has a radius of curvature of between about 4" and 6" (10.2 cm and 15.2 cm).

9. The adaptable, mountable feed bucket of claim 1, wherein each of the side receptacle walls are positioned relative to the back receptacle wall at an angle of less than 90 degrees, and the front receptacle wall is positioned relative to the receptacle base at an angle of greater than 90 degrees.

10. The adaptable, mountable feed bucket of claim 1, wherein the receptacle walls and the receptacle base each have a thickness of between about 0.4" and 0.5" (10.2 cm and 12.7 cm).

11. The adaptable, mountable feed bucket of claim 1, wherein the receptacle top rim has a thickness greater than the thickness of the receptacle walls.

12. The adaptable, mountable feed bucket of claim 1, wherein said third bracket leg is at least partially affixed to the back receptacle wall.

13. The adaptable, mountable feed bucket of claim 8, wherein the third bracket leg extends above the receptacle top rim by between about 0.5" and 1.5" (1.3 cm and 3.8 cm).

14. The adaptable, mountable feed bucket of claim 10, wherein portions of the bracket leg ribs are adjoined by a reinforcing structure.

15. The adaptable, mountable feed bucket of claim 10, wherein the bracket leg ribs of the first and second bracket legs are aligned.

16. The adaptable, mountable feed bucket of claim 13,
a. wherein the bracket legs each further comprises a reinforcing structure adjoining the bracket leg ribs within a set of bracket leg ribs, along at least a portion of their length;
b. wherein the reinforcing structure of the third bracket leg has a thickness equal to a thickness of the bracket leg ribs of the third bracket leg to form a solid surface in an area of the reinforcing structure;
c. wherein the reinforcing structure of the first and second bracket legs has a thickness less than a thickness of the bracket ribs, so that the bracket leg ribs protrude from the surface of the reinforcing structure; and
d. wherein the reinforcing structure adjoins at least a portion of the sets of bracket leg ribs of any of the first, second and third bracket legs.

17. The adaptable, mountable feed bucket of claim 1, wherein the first bracket leg comprises a curved exterior surface and a square interior surface.

18. An adaptable, mountable feed bucket suitable for securing to a fence rail, the mountable feed bucket comprising:
a. a receptacle defined by a receptacle top rim, a receptacle base, and front, back, and a pair of side receptacle walls, and further having a receptacle trough formed on the front receptacle wall;
b. one or more brackets affixed to the receptacle, each bracket having a first bracket leg extending orthogonally from the back receptacle wall, a second bracket leg extending perpendicular to the first bracket leg, at a first end of the first bracket leg, thereby forming a vacuous area between the back receptacle wall and the second bracket leg, the vacuous area being suitable for receiving a fence rail, and a third bracket leg extending perpendicular to the first bracket leg, at a second end of the first bracket leg opposing the first end of the first bracket leg,
wherein the first bracket leg, the second bracket leg and the third bracket leg each further comprises a reinforcing structure adjoining a plurality of bracket leg ribs, along at least a portion of their length,
wherein the reinforcing structure of the third bracket leg has a thickness equal to a thickness of the bracket leg ribs of the third bracket leg to form a solid surface in an area of the reinforcing structure,
wherein the reinforcing structure of the first and second bracket legs has a thickness less than a thickness of the bracket ribs, so that the bracket leg ribs protrude from the surface of the reinforcing structure, and
wherein the reinforcing structure adjoins at least a portion of the sets of bracket leg ribs of any of the first, second and third bracket legs; and
c. a removable secondary mount comprising a body sized and shaped to fit within at least a portion of the vacuous area, and a pair of feet extending from opposing ends of a side wall of the body, each of the feet comprising an aperture sized and configured to receive a cable tie, screw or bolt for securing the mountable feed bucket to a structure.

19. The adaptable, mountable feed bucket of claim 18, wherein the receptacle top rim has a thickness greater than the thickness of the receptacle walls.

20. The adaptable, mountable feed bucket of claim 18, wherein each of the side receptacle walls are positioned relative to the back receptacle wall at an angle of less than 90 degrees, and the front receptacle wall is positioned relative to the receptacle base at an angle of greater than 90 degrees.

\* \* \* \* \*